(12) United States Patent
Glückler et al.

(10) Patent No.: US 12,454,184 B2
(45) Date of Patent: Oct. 28, 2025

(54) METHOD AND CONTROL DEVICE FOR OPERATING A VEHICLE DRIVELINE

(71) Applicant: ZF Friedrichshafen AG, Friedrichshafen (DE)

(72) Inventors: Johannes Glückler, Friedrichshafen (DE); Christian Mittelberger, Ravensburg (DE); Stefan Spühler, Friedrichshafen (DE); Morten Scherpelz, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 192 days.

(21) Appl. No.: 18/240,537

(22) Filed: Aug. 31, 2023

(65) Prior Publication Data
US 2024/0066997 A1    Feb. 29, 2024

(30) Foreign Application Priority Data

Aug. 31, 2022   (DE) ..................... 10 2022 209 050.0

(51) Int. Cl.
*B60L 3/00*   (2019.01)
*B60L 3/06*   (2006.01)
*B60L 15/20*  (2006.01)

(52) U.S. Cl.
CPC ............. *B60L 15/20* (2013.01); *B60L 3/06* (2013.01); *B60L 2240/423* (2013.01)

(58) Field of Classification Search
CPC ...... B60L 15/20; B60L 3/06; B60L 2240/423; B60L 2220/42; B60L 3/003;
(Continued)

(56) References Cited

U.S. PATENT DOCUMENTS

| 2,037,126 A | 4/1936 | Ford |
| 5,879,265 A | 3/1999 | Bek |

(Continued)

FOREIGN PATENT DOCUMENTS

| CN | 201720039828 U | 12/2017 |
| CN | 201711214758 A | 5/2018 |

(Continued)

OTHER PUBLICATIONS

German Patent Office, Search Report issued in German application No. 10 2022 209 050.0 (Jul. 24, 2023).
(Continued)

*Primary Examiner* — Shardul D Patel
(74) *Attorney, Agent, or Firm* — Finch & Maloney PLLC (57) ABSTRACT

A vehicle powertrain has a first electrical machine with first power electronics and a second electrical machine with second power electronics. In symmetrical operation, the first and second electrical machines are loaded or operated with the same torque and with the same torque gradient. In a non-symmetrical operation, the first and second electrical machines are loaded or operated with a different torque and/or with a different torque gradient. If, after non-symmetrical operation the symmetrical operation is resumed, a subsequent modified operation can be used in which the electrical machine that was loaded or operated in non-symmetrical operation with higher torque and/or a higher torque gradient, is loaded or operated with a limited torque and/or with a limited torque gradient or is switched off or decoupled for a defined period of time, thereby at least partially compensating for a different aging of the electrical machines due to non-symmetrical operation.

11 Claims, 6 Drawing Sheets

(58) Field of Classification Search
CPC ............ B60L 3/0061; B60L 2240/525; B60L 2240/425; B60L 15/38; B60L 2240/36; B60L 2240/429; B60L 3/00
USPC .......................................................... 701/22
See application file for complete search history.

(56) References Cited

U.S. PATENT DOCUMENTS

| | | | |
|---|---|---|---|
| 6,557,656 | B2 | 5/2003 | Haniu et al. |
| 7,220,203 | B2 | 5/2007 | Holmes et al. |
| 7,363,996 | B2 | 4/2008 | Kamada et al. |
| 7,387,585 | B2 | 6/2008 | Bucknor et al. |
| 7,479,081 | B2 | 1/2009 | Holmes |
| 7,594,869 | B2 | 9/2009 | Holmes |
| 7,695,387 | B2 | 4/2010 | Oba |
| 7,967,711 | B2 | 6/2011 | Conlon et al. |
| 8,091,661 | B2 | 1/2012 | Oba et al. |
| 8,512,187 | B2 | 8/2013 | Puiu et al. |
| 8,528,676 | B2 | 9/2013 | Endo et al. |
| 9,566,857 | B1 | 2/2017 | Pritchard et al. |
| 10,968,983 | B2 | 4/2021 | Hara et al. |
| 11,002,350 | B2 | 5/2021 | Waltz |
| 11,124,064 | B2 | 9/2021 | Kaltenbach et al. |
| 11,156,280 | B2 | 10/2021 | Kurth |
| 11,364,784 | B2 | 6/2022 | Kaltenbach et al. |
| 11,365,785 | B2 | 6/2022 | Kumar et al. |
| 11,472,277 | B2 | 10/2022 | Glückler |
| 2006/0025263 | A1 | 2/2006 | Sowul et al. |
| 2009/0036263 | A1 | 2/2009 | Iwase et al. |
| 2009/0082154 | A1 | 3/2009 | Iwase et al. |
| 2011/0259657 | A1 | 10/2011 | Fuechtner |
| 2020/0400217 | A1 | 12/2020 | Billich |
| 2021/0188066 | A1* | 6/2021 | McGrew .................. B60K 1/02 |
| 2021/0372506 | A1* | 12/2021 | McGrew, Jr. ............. F16H 3/66 |
| 2022/0186468 | A1 | 6/2022 | Glöckner et al. |
| 2022/0364631 | A1 | 11/2022 | Glückler |
| 2022/0409500 | A1 | 12/2022 | Lechner |

FOREIGN PATENT DOCUMENTS

| | | |
|---|---|---|
| CN | 208630340 U | 3/2019 |
| DE | 1505723 | 7/1970 |
| DE | 10 2011 088 647 A1 | 6/2013 |
| DE | 10 2012 204 717 A1 | 9/2013 |
| DE | 10 2012 219 125 | 4/2014 |
| DE | 10 2015 215 393 A1 | 9/2016 |
| DE | 10 2018 001 508 B3 | 5/2019 |
| DE | 10 2017 011 387 A1 | 6/2019 |
| DE | 10 2020 203 669 A1 | 9/2021 |
| DE | 10 2020 215 124 A1 | 6/2022 |
| EP | 3587157 B1 | 6/2021 |
| WO | 2019/115204 A1 | 6/2019 |
| WO | 2020/030212 A1 | 2/2020 |
| WO | 2021063789 A1 | 4/2021 |

OTHER PUBLICATIONS

German Patent Office, Search Report issued in German patent application No. 10 2022 209 051.9 (Mar. 29, 2023).
German Patent Office, Search Report issued in German patent application No. 10 2022 209 052.7 (Mar. 15, 2023).
United States Patent and Trademark Office, Notice of Allowance issued in U.S. Appl. No. 18/192,044, (filed Oct. 1, 2024).
United States Patent and Trademark Office, Office Action issued in U.S. Appl. No. 18/192,018, (filed Sep. 25, 2023).
United States Patent and Trademark Office, Ex Parte Quayle Action issued in U.S. Appl. No. 18/240,530 (Jun. 11, 2025).

* cited by examiner

METHOD AND CONTROL DEVICE FOR OPERATING A VEHICLE DRIVELINE

RELATED APPLICATIONS

This application claims the benefit of and right of priority under 35 U.S.C. § 119 to German Patent Application no. 10 2022 209 050.0, filed on 31 Aug. 2022, the contents of which are incorporated herein by reference in its entirety.

FIELD OF THE DISCLOSURE

The invention relates to a method for operating a powertrain of a vehicle. The invention further relates to a control device for operating a powertrain of a vehicle.

BACKGROUND

DE 10 2019 214 986 A1 and DE 10 2019 216 562 A1 each disclose a powertrain of a vehicle designed as an electrical vehicle. The powertrains disclosed therein have a first electrical machine and a second electrical machine, wherein the two electrical machines act on a common output, namely a common driven axle, with the interposition of a transmission.

It is known from practical experience that a powertrain of a vehicle with two electrical machines can be operated in symmetrical operation of the electrical machines and in non-symmetrical operation of the electrical machines. In a symmetrical operation, the first electrical machine and the second electrical machine are loaded or operated with an equal torque and an equal torque gradient. In a non-symmetrical operation, the first electrical machine and the second electrical machine are loaded or operated with a different torque and/or a different torque gradient.

In the powertrains of DE 10 2019 214 986 A1 and DE 10 2019 216 562 A1, the non-symmetrical operation of the electrical machines is used in particular to per-form power-shifting in the transmission, which is connected between the two electrical machines and the output. Here, a first electric machine is used as the main driver machine and a second electric machine is used for traction assistance during the execution of the shifts. Such powershifts are also referred to as electrodynamic powershifts.

SUMMARY

If the electrical machines of a vehicle powertrain are loaded or operated with different torques and/or different torque gradients, they and the corresponding power electronics associated with the electrical machines are subject to different thermal loads. A different thermal load of the electrical machines as well as the power electronics leads to a different aging. Then, if the electrical machines or the power electronics age differently, this affects the available operating time of the powertrain. To ensure the longest possible service life or operating life of a powertrain, the electrical machines as well as the power electronics should age evenly.

There is a need for a method and a control device for operating a powertrain of a motor vehicle, with the aid of which it can be ensured that the electrical machines and the power electronics associated with the electrical machines age more evenly. On this basis, the invention is based on the task of creating a novel method and control device for operating a powertrain of a vehicle.

This task is solved by a method of operating a vehicle driveline as disclosed herein. According to the invention, if the powertrain is operated with a non-symmetrical operation of the electrical machines due to defined operating conditions of the powertrain and is to be changed back to a symmetrical operation of the electrical machines, subsequently in a modified operation, that electrical machine which was loaded or operated with a higher torque and/or with a higher torque gradient in the non-symmetrical operation of the electrical machines is loaded or operated with a limited torque and/or with a limited torque gradient, or that machine is switched off or decoupled for a defined period of time in order to at least partially compensate for a different aging of the first electrical machine and the second electrical machine as well as the first power electronics and the second power electronics caused by the non-symmetrical operation of the electrical machines.

If a powertrain is to be operated with a non-symmetrical operation of the electrical machines, in particular in order to execute an electrodynamic shift in a transmission to which the first and second electrical machines are coupled, it is proposed according to the invention not to subsequently shift directly to a symmetrical operation of the electrical machines, but rather to use a modified operation of the electrical machines in which the electrical machine which is loaded more heavily in the non-symmetrical operation and thus the respective power electronics which is loaded more heavily is loaded less heavily, in that, for a defined period of time, the respective electrical machine which was loaded or operated with a higher torque and/or with a higher torque gradient in symmetrical operation is subsequently loaded or operated with a limited torque and/or a limited torque gradient, or is even switched off or decoupled in order to at least partially balance out, or to compensate for, a different aging of a first and second electrical machines and the first and second power electronics caused by the non-symmetrical operation. This can be used to increase the availability of a powertrain. It can be avoided that such an electrical machine or such a power electronics, which is loaded or operated with a higher torque and/or with a higher torque gradient in a non-symmetrical operation, in particular in the design of an electrodynamic shift, ages noticeably earlier compared to the respective other electrical machine and reaches its maximum service life earlier.

Preferably, during the modified operation, the torque and/or torque gradient of those electrical machines that were loaded or operated with a lower torque and/or torque gradient in the non-symmetrical operation is increased to at least partially compensate for the limitation of torque and/or torque gradient or the shutdown or disconnection of the other electrical machine. This ensures that the driving performance is not impaired by the method according to the invention.

Preferably, the modified operation is used exclusively if the limitation of the torque and/or torque gradient of that electrical machine which was loaded or operated with a higher torque and/or with a higher torque gradient in the non-symmetrical operation can be compensated by the other electrical machine by more than a predetermined proportion, in particular, completely. This can also ensure that the powertrain performance is not impaired by the method according to the invention.

Preferably, the modified operation is used when acceleration or recuperation of the powertrain takes place and/or after acceleration has taken place or recuperation takes place during driving at an approximately constant driving speed, in particular when the respective electrical machine is operated in a base speed range. In particular, the modified operation of the invention is used when acceleration or recuperation of the drivetrain occurs and/or after acceleration or recuperation has occurred during a drive of the powertrain at a new driving speed. In this case, the respective electrical machine is preferably operated in a basic speed range or in a constant power range (constant torque range) of the electrical machine in order to be able to use the invention to the greatest possible extent.

The present disclosure is also directed to a control device configured to operate a powertrain of a vehicle.

BRIEF DESCRIPTION OF THE DRAWINGS

Preferred further embodiments result from the subclaims and the following description. Exemplary embodiments of the invention are explained in more detail, without being limited thereto, by reference to the drawing. It shows:

DETAILED DESCRIPTION

Figure 1:
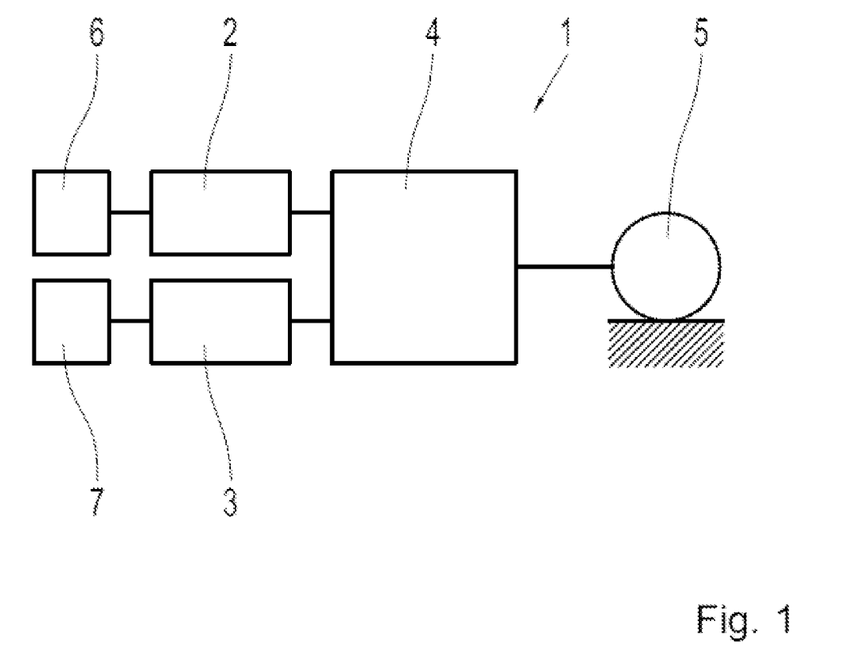
FIG. 1 is a block diagram of a powertrain of a prior art vehicle.

FIG. 1 shows a highly schematized block diagram of a powertrain 1 of a motor vehicle. The powertrain 1 of FIG. 1 has a first electrical machine 2 and a second electrical machine 3, whereby both electrical machines 2, 3 can provide input power at an output 5 with the interposition of a transmission 4. In the powertrain configuration of FIG. 1, both electrical machines 2, 3 act on the common output 5 via a common transmission 4. The first electrical machine 2 is assigned first power electronics 6 and the second electrical machine 3 is assigned second power electronics 7. The powertrain of FIG. 1 can be configured, for example, as known from DE 10 2010 214 986 A1 or DE 10 2019 216 562 A1.

Figure 2:
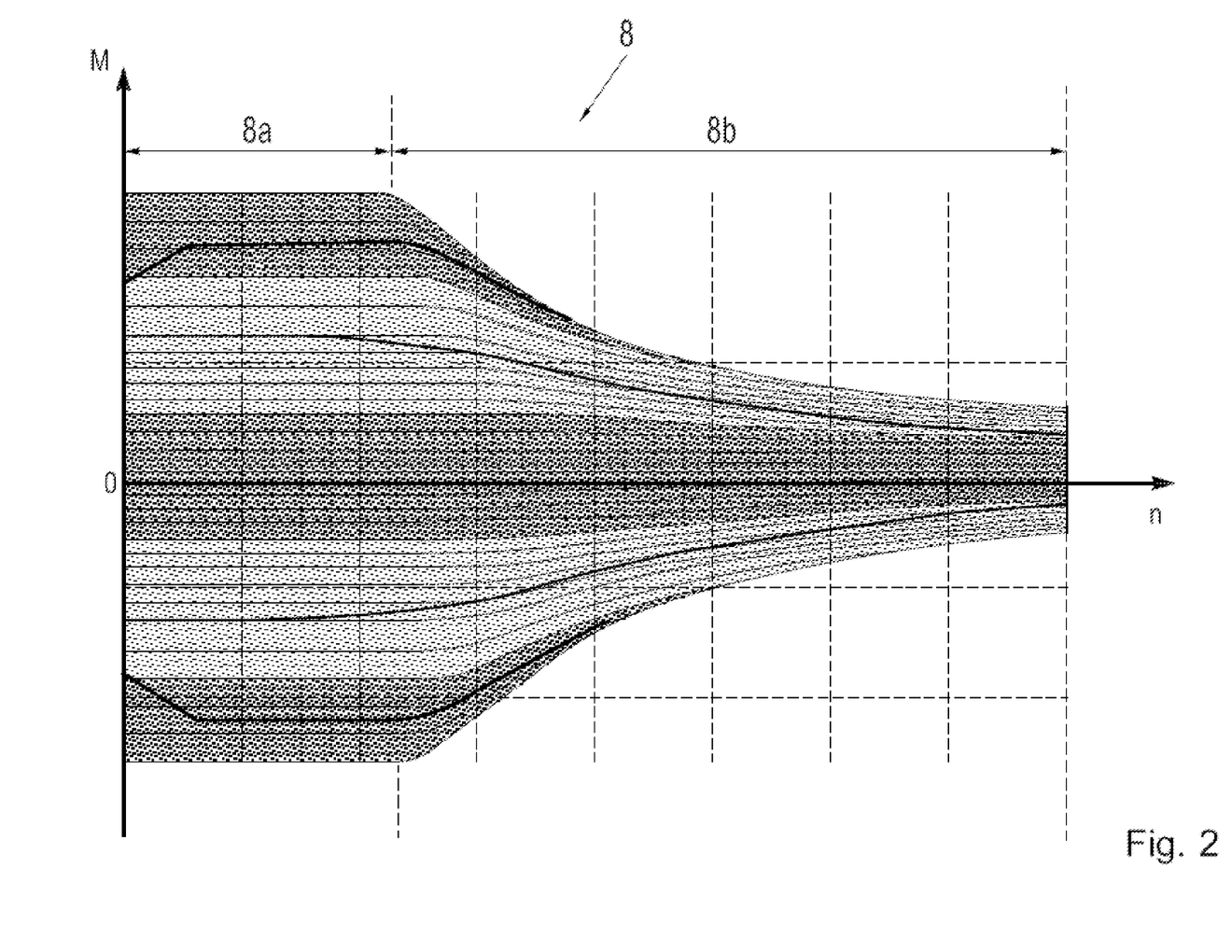
FIG. 2 is an exemplary characteristic diagram of an electrical machine.

FIG. 2 shows a characteristic diagram 8 of an electrical machine, where the torque M is plotted above the speed n in the characteristic diagram 8. A characteristic diagram range 8a of characteristic diagram 8 is referred to as the base speed range or constant torque range. A characteristic diagram range 8b of characteristic diagram 8 is referred to as the field weakening range or constant power range of characteristic diagram 8.

The powertrain of FIG. 1 can be operated in or with symmetrical operation of the electrical machines 2, 3 and in or with non-symmetrical operation of the electrical machines 2, 3. In a symmetrical operation of the electrical machines 2, 3 of the powertrain 1, the first electrical machine 2 and the second electrical machine 3 are loaded or operated with an equal torque and an equal torque gradient, such that equal loads, namely equal currents and equal thermal loads, then also result for the power electronics 6 and 7.

In a non-symmetrical operation of the electrical machines 2, 3 of the powertrain 1, the first electrical machine 2 and the second electrical machine 3 are loaded or operated at a different torque and/or a different torque gradient, so that different electrical currents and different thermal loads are then also formed for the power electronics 6, 7.

In the powertrain of FIG. 1, in which both electrical machines 2, 3 act on the common output 5 via the common transmission 4, non-symmetrical operation of the electrical machines 2, 3 is used in particular to execute electrodynamic powershifting in the transmission 4, in which one of the electrical machines 2, 3 is used as the main drive and the other electrical machine 3, 2 in each case is used to provide tractive force support during the execution of the shifting operations.

Figure 3:
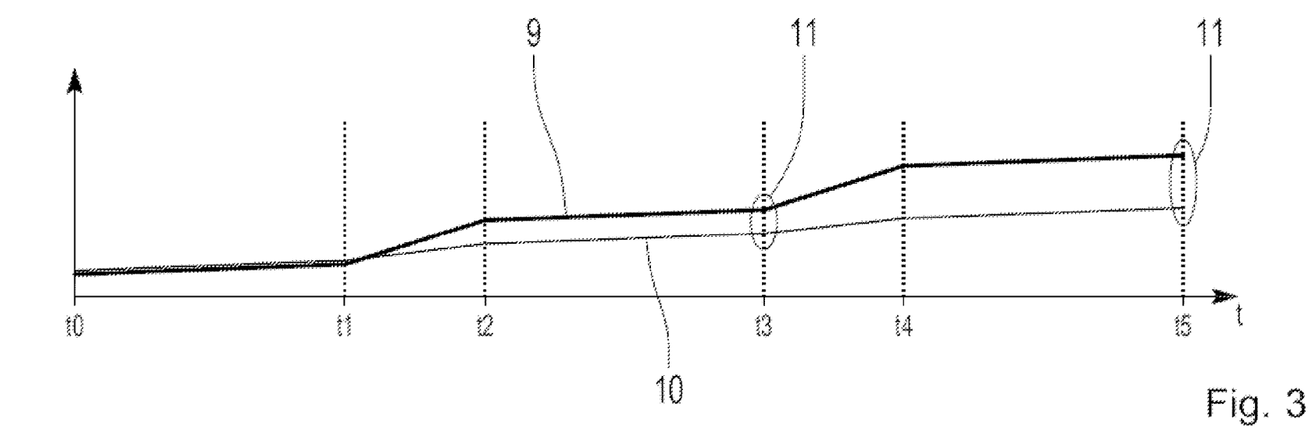
FIG. 3 is an exemplary time curve of aging indices formed according to the prior art.

In FIG. 3, aging indices 9, 10 are plotted for the two electrical machines 2, 3 and for the two power electronics 6, 7 over time t, respectively, as they can form according to the prior art. Thus, in FIG. 3, the two electrical machines 2, 3 and thus the power electronics 6, 7 of the same are operated in symmetrical operation between the times t0 and t1, between the times t2 and t3, and between the times t4 and t5, respectively, whereas the same are operated in non-symmetrical operation between the times t1 and t2 and between the times t3 and t4.

Between the times t1 and t2 and the times t3 and t4, for example, electrodynamic powershifting can be carried out in transmission 4, in which one of the electrical machines is used as the main drive and the respective other electrical machine is used for tractive force support. In the time periods t1 to t2 and the time periods t3 to t4 in which the electrical machines 2, 3 and thus the power electronics 6, 7 are operated in a non-symmetrical mode, the aging indices 9, 10 develop distinctly differently from one another, with the aging index 9 belonging to that electrical machine 2, 3 and that power electronics 6, 7 which is loaded or operated in the non-symmetrical operation with a higher torque and/or a higher torque gradient.

FIG. 3 shows that as a result of each non-symmetrical operation, the aging indices 9, 10 become increasingly distant from each other, so that one of the electrical machines 2, 3 and thus one of the power electronics 6, 7 ages more strongly or faster than the other electrical machine 3, 2 or power electronics 7, 6. As a result, the total service life of the powertrain is reached earlier, reducing the service life of the same. In FIG. 3, the ranges 11 at the end of each symmetrical operation following a non-symmetrical operation visualize the aging indices 9, 10 becoming increasingly more distant from each other.

The invention is concerned with at least partially compensating for the differ-ential aging of the electrical machines 2, 3 and thus of the power electronics 6, 7 caused by non-symmetrical operation of the latter. For this purpose, if the powertrain 1 has been operated in a non-symmetrical operation of the electrical machines 2, 3 due to defined operating conditions, in particular for the execution of an electrodynamic shift in the transmission 4, and subsequently is to be changed back to a symmetrical operation of the electrical machines 2, 3, then a modified operation of the electrical machines 2, 3 is subsequently used, either before a return to the symmetrical operation and/or after a return to the symmetrical operation.

In the modified operation, the electrical machine 2, 3 which was loaded or operated with a higher torque and/or with a higher torque gradient in the non-symmetrical operation, is loaded or operated with a limited torque and/or with a limited torque gradient for a defined period of time or even completely switched off or decoupled in order to at least partially compensate for the different aging of the electrical machines 2, 3 and thus of the power electronics 6, 7 caused by the non-symmetrical operation.

Figure 4:
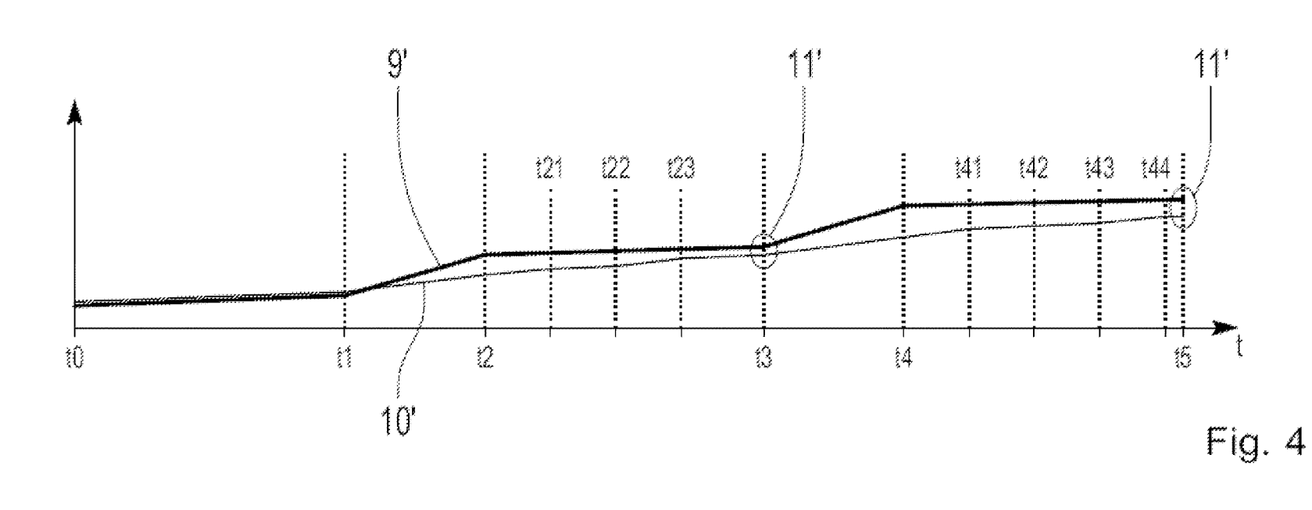
FIG. 4 is an exemplary time curve of aging indices formed according to the prior art.

Here, the aging indices 9', 10' of FIG. 4 can be formed, whereby the aging index 9' belongs to that electrical machine or power electronics which is more heavily loaded in non-symmetrical operation, whereas the aging index 10' belongs to the other electrical machine or power electronics which is less heavily loaded in non-symmetrical operation.

In FIG. 4, as in FIG. 3, non-symmetrical operation of the electrical machines 2, 3 takes place between the times t1 and t2 as well as between the times t3 and t4, in which the electrical machines 2, 3 are loaded or operated with different torques and/or with different torque gradients. In FIG. 4, after a termination of a non-symmetrical operation at time t2 or at time t4, the return to a symmetrical operation of the electrical machines 2, 3 does not take place immediately, rather in FIG. 4, for example between the times t2 and t21 and between the times t22 and t23 as well as between the times t4 and t41 as well as t42 and t44, the electrical machine which was loaded or operated with a higher torque and/or a higher torque gradient in the previous non-symmetrical operation is loaded or operated with a limited torque and/or a limited torque gradient, so that the different development of the aging indices caused by a non-symmetrical operation can be at least partially compensated.

Thus, in the time periods between time points t2 and t21, between time points t22 and t23, between time points t4 and t41, and between time points t42 and t44, the aging indices 9' and 10' converge again more strongly, so that the different aging of the electrical machines 2, 3 and thus power electronics 6, 7 can be at least partially compensated.

In contrast to the areas 11 of FIG. 3, the areas 11' of FIG. 4 illustrate that by using the method according to the invention, the aging indices 9', 10' deviate from each other to a much lesser extent than the aging indices 9, 10 formed according to the prior art. Accordingly, a more uniform aging of the electrical machines 2, 3 and thus of the power electronics 6, 7 is ensured despite a non-symmetrical operation of the powertrain 1 of FIG. 1, so that the overall service life of the powertrain, namely of the electrical components thereof, can be increased.

In FIG. 4, symmetrical operation takes place between times t21 and t22, between times t23 and t3, between times t41 and t42, and between times t44 and t5, in which the aging indices 9' and 10' develop uniformly. Between time points t2 and t21 and between time points t22 and t23, the electrical machine, which is more heavily loaded in non-symmetrical operation, is operated with a limited torque gradient, as is the case between time points t4 and t41 and time points t43 and t44. Between times t42 and t43, the electrical machine that is more heavily loaded in non-symmetrical operation is switched off completely.

Accordingly, it is within the scope of the invention if a powertrain 1 comprising a first electrical machine 2 with associated power electronics 6 and a second electrical machine 3 with associated power electronics 7 is operated in a non-symmetrical mode of the electrical machines, in particular for the execution of an electrodynamic shift, in which one of the electrical machines is loaded or operated with a higher torque and/or a higher torque gradient than the other of the electrical machines, and if subsequently it is desired to change back to symmetrical operation, then subsequently a modified operation of the electrical machines can be used, before a symmetrical operation and/or after a symmetrical operation, where in the modified operation that electrical machine which was loaded or operated with a higher torque and/or with a higher torque gradient in the preceding non-symmetrical operation is loaded or operated with a limited torque and/or with a limited torque gradient or is completely switched off or decoupled for a defined period of time in order to at least partially compensate for different aging of the electrical machines 2, 3 and the associated power electronics 6, 7 caused by the non-symmetrical operation.

In particular, it is intended that during the modified operation of the electrical machines, the torque and/or the torque gradient of that electrical machine 2, 3 which was loaded or operated in non-symmetrical operation with a lower torque and/or with a lower torque gradient is increased in order to compensate at least partially, preferably completely, for the limitation of the torque and/or torque gradient or the switching off or the decoupling of the other electrical machine, so that the power of the powertrain is not limited despite the modified operation of the electrical machines. This can then ensure that the performance of the powertrain is not reduced or is reduced only slightly during the execution of the method according to the invention.

In particular, the modified operation is used exclusively if the limitation of the torque and/or limitation of the torque gradient of that electrical machine 2, 3 which was loaded or operated with a higher torque and/or with a higher torque gradient in the non-symmetrical operation can be compensated by the respective other electrical machine 3, 2 by more than a predetermined proportion, in particular can be compensated completely. This can then ensure that the performance of the vehicle does not change, or changes only slightly, when the method according to the invention is used.

Preferably, the modified operation of the electrical machines 2, 3 is used when acceleration or recuperation of the powertrain 1 occurs and/or after acceleration has occurred or after recuperation has occurred during travel of the powertrain 1 at a constant travel speed.

In particular, the modified operation of the electrical machines 2, 3 is used when the respective electrical machine 2, 3 is operated in its base speed range 8a or adjacent to the base speed range 8a. In the base speed range 8a or close to the base speed range 8a, the respective electrical machine 2, 3 can be operated with high torques, such that relatively high electric currents also flow in the respective power electronics 6, 7 here and the effect of the invention, namely the at least partial compensation of a different aging of electrical machines 2, 3 and associated power electronics 6, 7 caused by a non-symmetrical operation, can be used more extensively than in the field weakening range 8b of the characteristic diagram 8 of the respective electrical machine 2, 3.

Further embodiments of the invention are described below with reference to the diagrams in FIGS. 5 through 10, in which torque curves are plotted in each case over time t.

In FIGS. 5 through 10 it is to be assumed that in each case at the respective time t0 a non-symmetrical operation of the electrical machines 2, 3 is to be terminated, in particular for the execution of an electrodynamic shift. Before time t0, one of the electrical machines 2, 3 is or was loaded or operated with a higher torque and/or a higher torque gradient than the respective other electrical machine.

Figure 5:
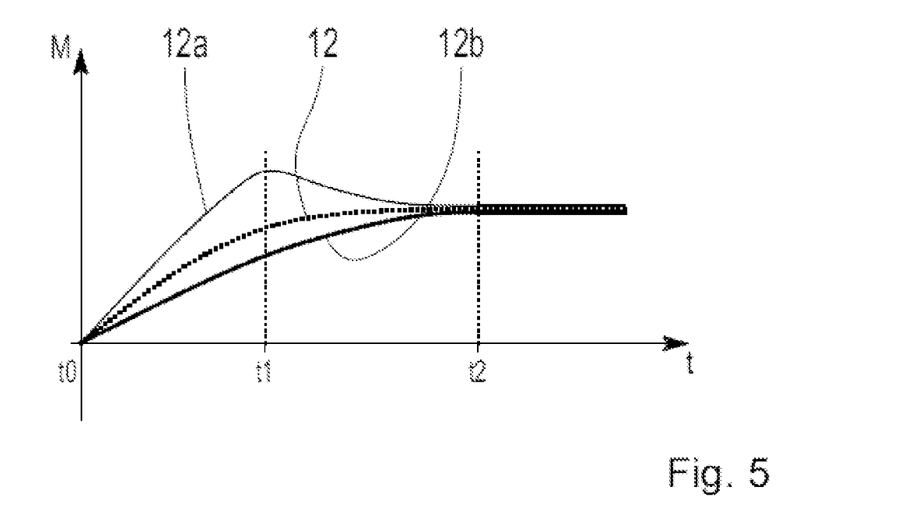
FIG. 5 is an exemplary time curve of torques according to the invention.

Starting at time t0, the powertrain 1 is to be accelerated in FIG. 5, for which purpose both electrical machines would be loaded or operated with a torque 12, which is shown by a dotted curve in FIG. 5, when symmetrical operation is used.

According to the invention, however, during acceleration of the powertrain starting at time t0, there is no change to the symmetrical operation of the electrical machines 2, 3 according to curve 12, rather, according to curve 12a, that electrical machine, which was loaded or operated in non-symmetrical operation before time t0 with a lower torque and/or a lower torque gradient, is operated with a higher torque gradient according to curve 12a; the electrical machine which was loaded more heavily in the non-symmetrical operation is operated with a lower torque gradient according to curve 12b.

Accordingly, between times t0 and t1 and between times t1 and t2, the modified operation is used to at least partially compensate for the different aging of the electrical machines 2, 3 and the associated power electronics 6, 7 caused by a previous non-symmetrical operation. In FIG. 5, between the times t0 and t2, the torque gradient of the electrical machine loaded more heavily in non-symmetrical operation is limited according to the curve 12b, and according to the curve 12a the torque gradient of the electrical machine loaded less heavily in non-symmetrical operation is increased at the same time.

Then, at time t1 when the two electrical machines 2, 3 provide the desired total torque in sum, the torque is subsequently reduced at the electrical machine 2, 3 that is less loaded in non-symmetrical operation according to the curve 12a, and the torque is further increased with the limited torque gradient at the electrical machine that is more heavily loaded in the preceding non-symmetrical operation according to the curve 12b, in order to change over to symmetrical operation of the electrical machines 2, 3 at time t2. Starting at time t2, both electrical machines 2, 3 are again loaded or operated with the same torque and the same torque gradient. There is then symmetrical operation of the electrical machines 2, 3.

Figure 6:
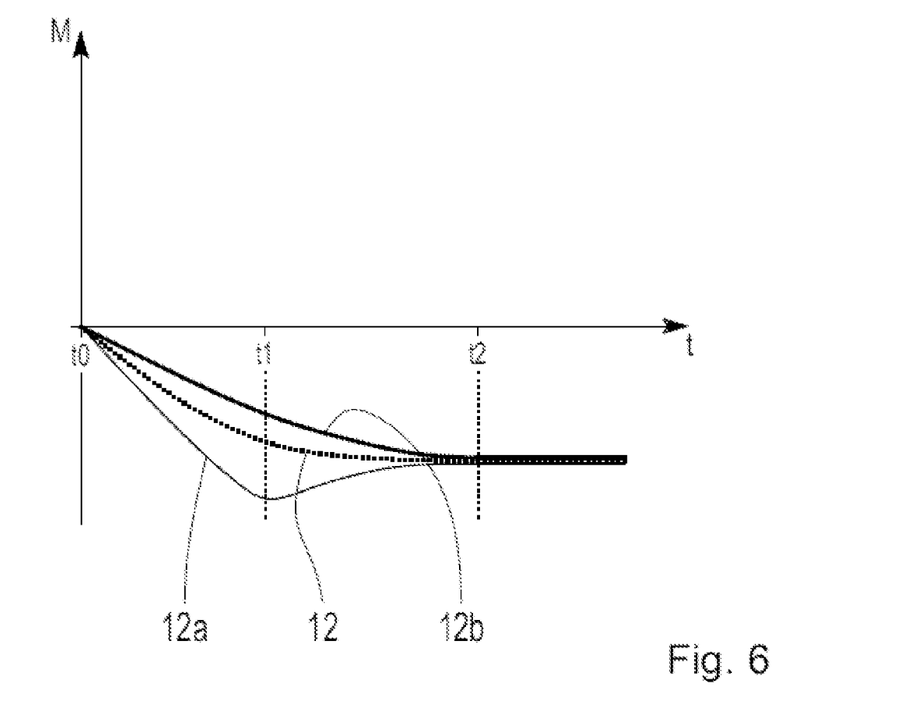
FIG. 6 is an exemplary time curve of torques according to the invention.

While FIG. 5 shows this procedure for acceleration of the powertrain 1, FIG. 6 shows the torques 12a and 12b for recuperation of the powertrain 1, i.e., when the latter is braked while simultaneously generating electrical energy. At time t0, after termination of the non-symmetrical operation of the electrical machines 2, 3, which was caused in particular by an electrodynamic shift, there is no immediate change to the symmetrical operation of the electrical machines 2, 3; rather the modified operation is first used between the times t0 and t1 as well as t1 and t2, in which the electrical machine more heavily loaded in the non-symmetrical operation is operated with a lower torque gradient according to the curve 12b, whereas according to the curve 12a the electrical machine less heavily loaded in the non-symmetrical operation is operated with a higher torque gradient, namely, with the aim of compensating for the limitation of the torque gradient of the electrical machine more heavily loaded in the non-symmetrical operation.

Accordingly, in FIGS. 5 and 6, in the modified operation of the electrical machines 2, 3, there is a limitation of the torque gradient of the electrical machine that is more heavily loaded in the non-symmetrical operation of the electrical machines 2, 3.

To maintain the performance of the vehicle, the torque gradient of the electrical machine that is less loaded in non-symmetrical operation of the electrical machines 2, 3 is raised accordingly.

FIGS. 5 and 6 show examples of the start of acceleration and recuperation for one vehicle respectively.

However, the method according to the invention can be used for all accelerations and recuperations of the powertrain, i.e., also for those in which the vehicle is not stationary at time t0, in particular in the base speed range or adjacent to the base speed range of the respective electrical machine.

Figure 7:
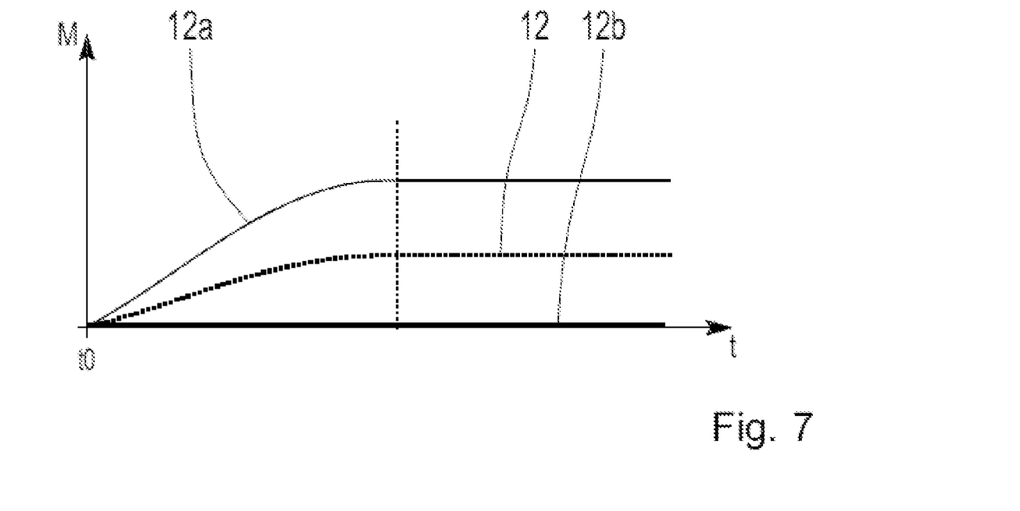
FIG. 7 is an exemplary time curve of further torques according to the invention.
Figure 8:
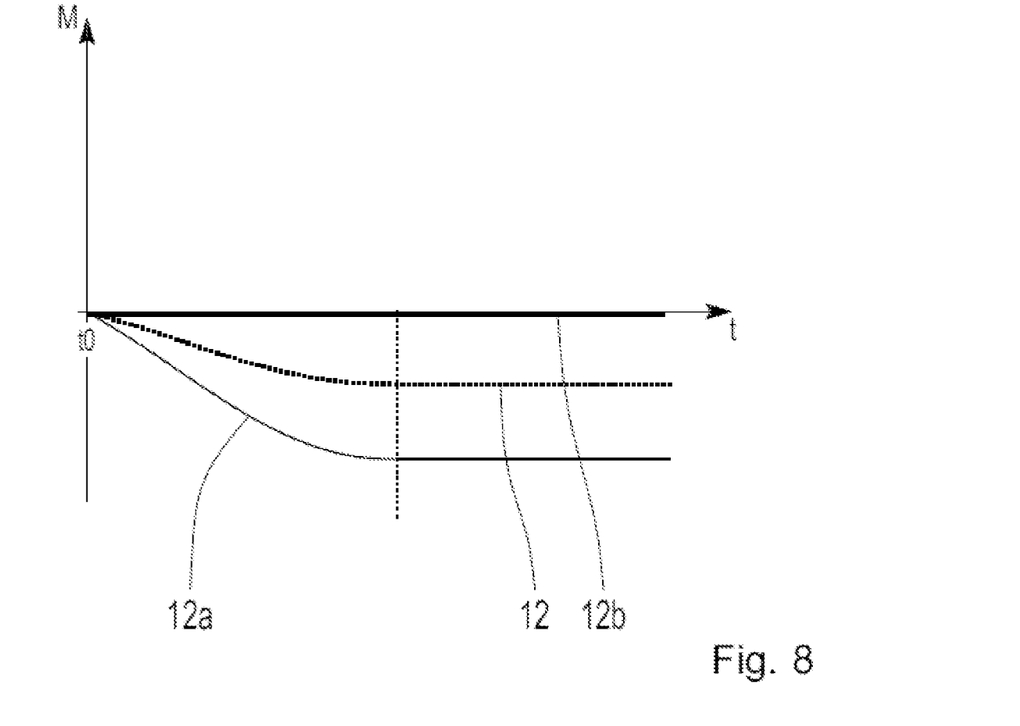
FIG. 8 is an exemplary time curve of further torques according to the invention.

FIGS. 7 and 8 show the torque curves 12, 12a, and 12b, namely FIG. 7 the torque curves 12, 12a, and 12b for an acceleration and FIG. 8 the torque curves 12, 12a, and 12b for a recuperation, whereby in FIGS. 7 and 8, according to the torque curves 12b, the electrical machine loaded more heavily in the non-symmetrical operation before the time t0 is switched off or uncoupled and only the electrical machine loaded less heavily in the non-symmetrical operation is used according to the curve 12a to provide the required torque. Accordingly, in FIGS. 7 and 8, during acceleration (FIG. 7) or recuperation (FIG. 8) followed by travel at constant speed, the electrical machine loaded more heavily in non-symmetrical operation is disconnected or switched off, since during acceleration or recuperation and subsequent travel at constant speed, the electrical machine loaded with the lower torque and/or the lower torque gradient in non-symmetrical operation alone can provide the required torque.

Figure 9:
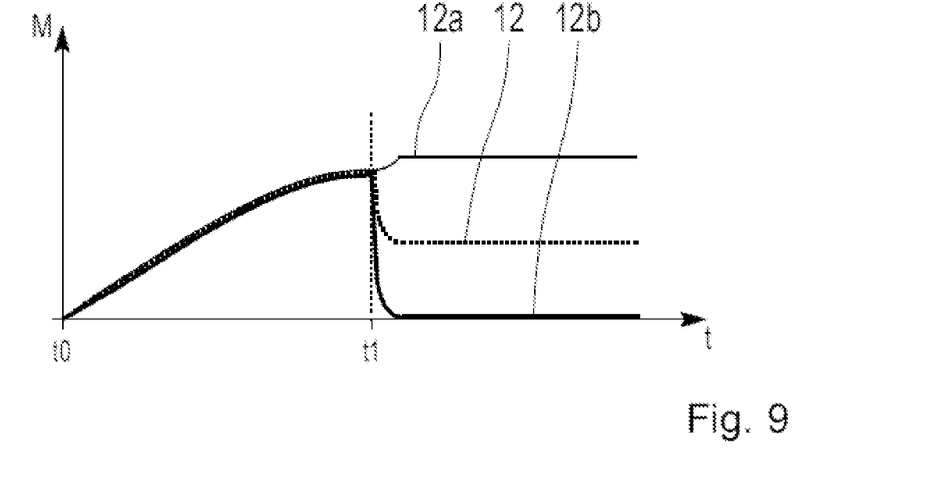
FIG. 9 is an exemplary time curve of further torques according to the invention.
Figure 10:
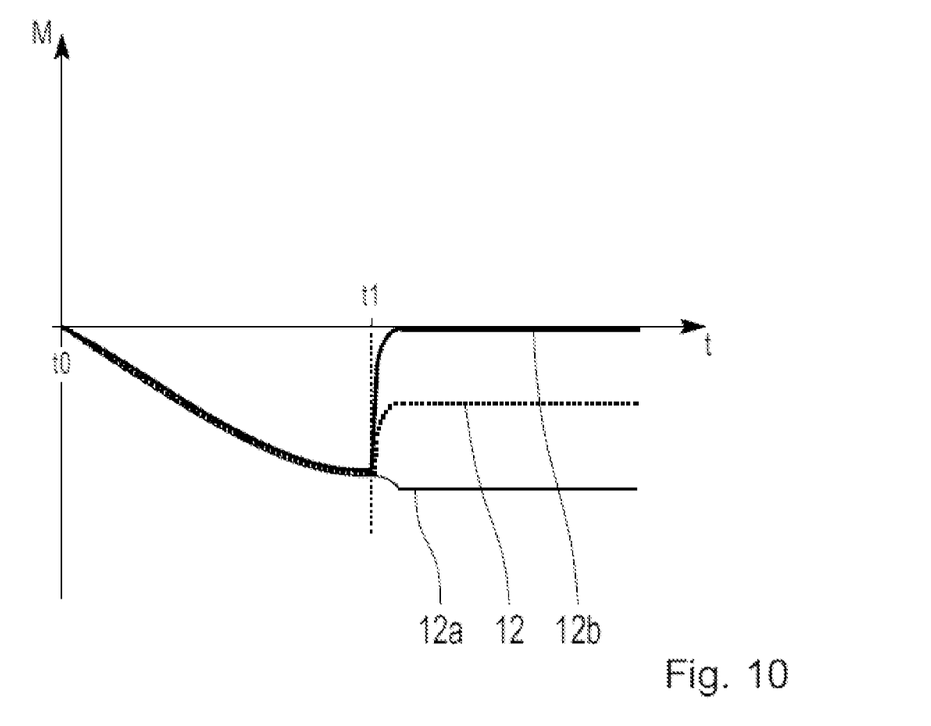
FIG. 10 is an exemplary time curve of further torques according to the invention.

FIGS. 9 and 10 show the torque curves 12, 12a, and 12b for a situation in which, after a desired termination of a non-symmetrical operation at time t0 to provide the desired torque during acceleration (FIG. 9) and recuperation (FIG. 10) up to time t1, both electrical machines 2, 3 are required and are then initially loaded or operated in symmetrical operation with the same torque and the same torque gradient, until then starting at time t1 with the start of a journey at a constant driving speed which occurs in non-symmetrical operation, the time t0 less loaded electrical machine alone can provide the desired torque, so that then at time t1 according to the torque curve 12b the more heavily loaded electrical machine before time t0 in non-symmetrical operation is decoupled or switched off, and then starting at time t1 alone the before the point in time t0 in non-symmetrical operation, the electrical machine that is less heavily loaded alone provides the required torque according to curve 12a.

Thus, while in FIGS. 7 and 8 there is slight acceleration (FIG. 7) or slight recuperation (see FIG. 8) between the times t0 and t1, in FIGS. 9 and 10 the respective acceleration and the respective recuperation (FIG. 10) are stronger, so that the corresponding torque can only be provided jointly by both electrical machines. In this case, the same are then initially operated in a symmetrical operation before the electrical machine previously more heavily loaded in the non-symmetrical operation is then switched off or decoupled at time t1.

The invention further relates to a control device which is set up to automatically execute the above-described method. Such a control device is preferably an electronic control device which has means on the hardware side and means on the software side for executing the method according to the invention. The hardware-side means include data interfaces for exchanging data with the assemblies involved in carrying out the method according to the invention, for example with the electrical machines 2, 3 and/or the power electronics 6, 7. The hardware-side means also include a processor for data processing and a memory for data storage. Software-side means include program modules implemented in the control device for carrying out the method according to the invention.

If the powertrain was operated with non-symmetrical operation of the electrical machines 2, 3 due to defined operating conditions and is then to be switched back to symmetrical operation of the electrical machines 2, 3, the control device then controls the electrical machine in a modified operation machine that has been loaded or operated in non-symmetrical operation with a higher torque and/or with a higher torque gradient, for a defined period of time with a limited torque and/or with a limited torque gradient, switches on or switches off the same or coupled the same off to at least partially compensate for different aging of the electrical machine and the power electronics caused by the non-symmetrical operation.

LIST OF REFERENCE NUMERALS

1 powertrain
2 electrical machine
3 electrical machine
4. transmission
5 output
6 power electronics
7 power electronics
8 characteristic diagram
8a characteristic diagram range
8b characteristic diagram range
9 aging index
9' aging index
10 aging index
10' aging index
11 range
11' range
12 torque
12a torque
12b torque

The invention claimed is:

1. A method for operating a powertrain of a vehicle, the powertrain comprising a first electrical machine with a first power electronics and a second electrical machine with a second power electronics, the method comprising:
    operating the powertrain in a non-symmetrical operation of the electrical machines wherein the first electrical machine and the second electrical machine are loaded or operated with a different torque and/or with a different torque gradient;
    changing operation of the powertrain to a symmetrical operation of the electrical machines in which the first electrical machine and the second electrical machine are loaded or operated with an equal torque and with an equal torque gradient; and
    operating the powertrain subsequently according to a modified operation in which one machine of the electrical machines previously operated in the non-symmetrical operation with a higher torque and/or with a higher torque gradient, is loaded or operated with a limited torque and/or with a limited torque gradient or is switched off or decoupled for a defined period of time in order to at least partially compensate for a different aging of first and second electrical machines and first and second power electronics caused by the non-symmetrical operation.

2. The method according to claim 1, wherein operating the powertrain subsequently according to the modified operation includes raising a torque and/or a torque gradient of an other machine of the electrical machines previously operated in the non-symmetrical operation with a lower torque and/or with a lower torque gradient, thereby at least partially compensating for limiting torque and/or torque gradient or the disconnection or the decoupling of the other electrical machine.

3. The method according to claim 1, wherein operating the powertrain according to the modified operation includes limiting the torque and/or torque gradient of the one machine of the electrical machines which was loaded or operated in the non-symmetrical operation with a higher torque and/or with a higher torque gradient so that the respective torque or torque gradient is compensated by an other machine of the electrical machines by more than a predetermined proportion.

4. The method according to claim 3, wherein during the modified operation, limiting the torque and/or torque gradient of the one machine of the electrical machines which was loaded or operated with a higher torque and/or with a higher torque gradient in the non-symmetrical operation is fully compensated by the other machine of the electrical machines.

5. The method according to claim 1, wherein operating the powertrain according to the modified operation includes acceleration or recuperation of the powertrain and/or is performed after acceleration has taken place or recuperation takes place during travel of the powertrain.

6. The method according to claim 5, comprising:
    determining that, during acceleration or recuperation the respective torque cannot be provided solely by the other electrical machine of the electrical machines which in non-symmetrical operation was loaded or operated with a lower torque and/or with a lower torque gradient;
    limiting the torque gradient, during acceleration or recuperation, of the one machine of the electrical machines, which was loaded or operated in the non-symmetrical operation with a higher torque and/or with a higher torque gradient;
    terminating the acceleration or recuperation of the powertrain;
    terminating the modified operation; and
    resuming the symmetrical operation of the electrical machines.

7. The method according to claim 5, comprising:
    determining, during acceleration or recuperation, that the respective torque cannot be provided solely by the other electrical machine which in the non-symmetrical operation was loaded or operated with a lower torque and/or with a lower torque gradient;
    resuming the symmetrical operation during acceleration or recuperation; and
    switching off or decoupling, during subsequent travel at a driving speed, the one electrical machine which was loaded or operated in non-symmetrical operation with a higher torque and/or with a higher torque gradient.

8. The method according to claim 5, comprising:
    determining that, during acceleration or recuperation, the respective torque can be provided solely by the other machine of the electrical machines which in non-symmetrical operation was loaded or operated with a lower torque and/or with a low torque gradient; and
    switching off or uncoupling the one machine of the electrical machines which in non-symmetrical operation was loaded or operated with a higher torque and/or with a higher torque gradient.

9. The method according to claim 8, wherein switching off or uncoupling is performed in a journey following the acceleration or recuperation.

10. The method according to claim 1, wherein operating the powertrain according to the modified operation is performed when the respective electrical machine is operated in a base speed range and/or constant power range.

11. A control device of a vehicle, the control device configured to automatically execute the method according to claim 1.

* * * * *